Dec. 28, 1965 G. M. MEES ETAL 3,226,531

ELECTRONIC WIRE TURN COUNTER

Filed April 30, 1963

INVENTOR.
GEORGE M. MEES
KENNETH C. MURCH
BY
ATTORNEY 3,226,531
Patented Dec. 28, 1965

3,226,531

ELECTRONIC WIRE TURN COUNTER

George M. Mees, Newtown, and Kenneth C. Murch, Brookfield, Conn., assignors to NEWAL, Inc., a corporation of Massachusetts Filed Apr. 30, 1963, Ser. No. 276,937
3 Claims. (Cl. 235—92)

Our invention relates to an electronic wire turn counter and more particularly to an automatic proximity detector for counting the number of turns of wire applied to a toroidal core by a mechanical winding machine.

Heretofore methods of counting the turns of wire being applied to a core included a mechanical method wherein each turn of wire makes physical contact with a switch; a photoelectric method wherein each turn of wire interrupts a light beam causing operation of photoelectric response counter circuits; and a third method consisting of proximity circuits in which capacitance-change sensing circuits are affected by each turn of wire as it is applied to the core causing a frequency shift which is amplified and discriminated to generate a counter driving pulse.

The mechanical method has serious limitations and faults since it is difficult to adjust switch actuators in such a manner that fine wire is not damaged or broken and that large wire does not cause bounce of the actuator with consequent spurious counting.

The photoelectric method is generally unsatisfactory because of the difficulty in alignment of the light beam and the difficulty of triggering the photoelectric response circuit when fine wire is being wound on the core.

The capacitance proximity sensing counter method is subject to error due to frequency shifts arising from atmospheric conditions and aging of the components; thus necessitating frequent and time consuming adjustments.

One of the objects of our invention is to provide an automatic counter which makes no contact with the wire being wound on the core.

Another object of our invention is to provide an automatic counter which will accurately sense and indicate each turn of wire as it is applied at high speed to a core.

Other objects and advantages of our invention will be apparent by reference to the specifications and the drawings in which.

It will be understood by those skilled in the art that the entire system, hereinafter described, is powered by a suitable stable source of B+ and B− electrical energy; such sources are conventional and have been omitted from the schematic and are only indicated therein.

Figure 1:
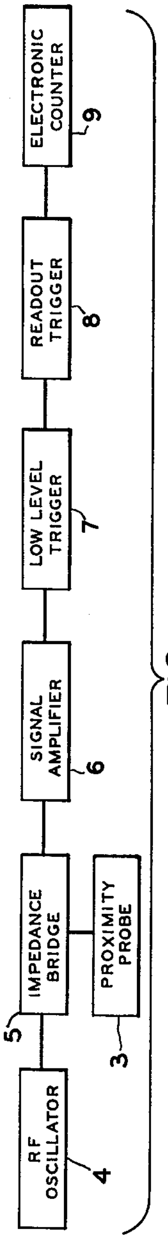
FIG. 1 is a block diagram of the invention.

Referring to FIG. 1 of the drawing, 3 is the proximity probe, which is an adjunct to the impedence bridge 5, while 4 is a source of radio frequency oscillation in the neighborhood of 15 megacycles, although the frequency of oscillation is not critical. Block 6 represents a cascaded triple amplifier section, 7 is a low level trigger circuit and 8 a readout trigger circuit whose output is fed into a conventional electronic counter 9. Again the schematic of the electronic counter is not shown because it is well known in the art.

Figure 2:
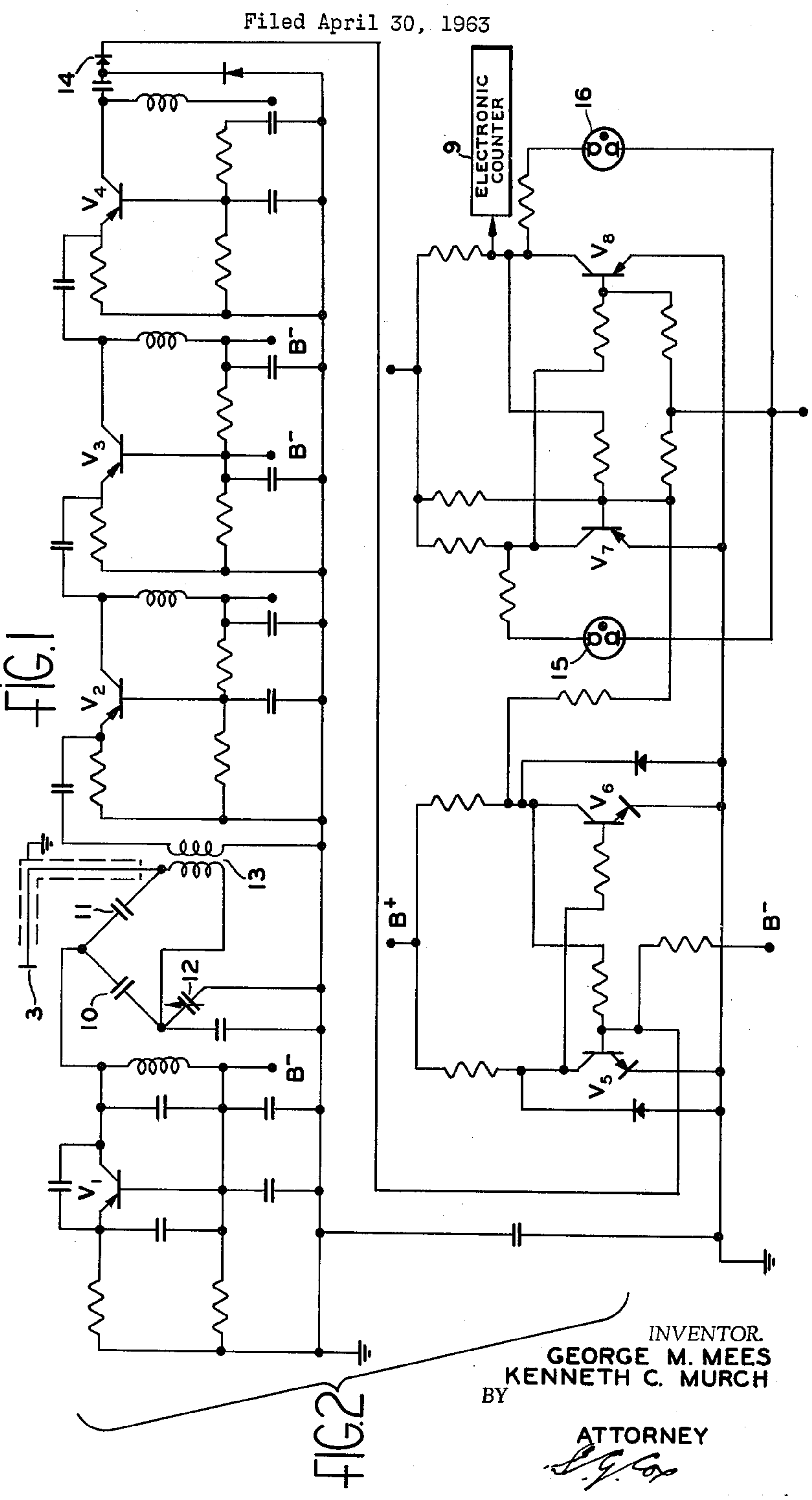
FIG. 2 is a schematic of the invention.

Referring to FIG. 2, transistor V1 and its associated circuit constitute an R.F. oscillator with the output of V1 being applied to impedence bridge 5 and its proximity probe 3. The bridge consists of fixed condensors 10, 11 and variable condensor 12 for balancing the bridge.

The impedence bridge must initially be balanced as will later be explained.

When the impedence bridge is in balance and a strand of wire passes near the probe 3, a condition of unbalance will occur in the bridge circuit causing a small signal from V1 to pass through bridge 5. This signal is introduced at the primary of a radio frequency transformer 13 and is then delivered by the transformer's secondary to transistors V2, V3 and V4 which, with their associated components, form a three stage broad band tuned R.F. cascaded amplifier circuit.

After amplification the signal is rectified by diode 14 and fed into transistors V5 and V6 which, with their associated components, form a low level trigger circuit. The output of the low level trigger is applied to the input of a readout trigger circuit consisting of transistors V7 and V8 and their associated components and the output of the readout trigger is then applied to the input of a conventional electronic counter where the number of turns of wire wound on a coil form may be observed.

*Operation*

With no wire close to probe 3, variable condenser 12 is adjusted until bridge 5 and probe 3 are in balance at which point no signal from oscillator circuit 4 can pass through the bridge. This will be visually indicated when neon lamp 15 is unlit and lamp 16 is lighted; thus indicating that the circuit is in correct operating condition.

As a strand of wire passes in front of proximity probe 3 the bridge 5 becomes unbalanced thus allowing a signal to flow through the succession of circuits and actuate counter 9 as previously described.

It will be understood by those skilled in the art that this system senses the proximity of a wire strand by use of broad band R.F. amplifiers operating in a common base configuration and applying the output of the amplifiers to non-linear trigger amplifiers which increase system stability and noise rejection.

It will also be understood by those skilled in the art that changes may be made in our invention without departing from its scope; as for example conventional and appropriate vacuum tubes may be substituted for all the transistors specified in our preferred form heretofore disclosed.

We claim:

1. A wire turn counter for a coil winding machine which comprises: a radio frequency oscillator; a capacitance balanced impedance bridge supplied by said oscillator; a single proximity probe forming one leg of said bridge and positioned adjacent the path of travel of a wire strand forming the turns to be counted to unbalance said bridge upon each approach of said strand and produce successive voltage amplitude signals across the output of said bridge, said signals having substantially the same frequency as the output of said oscillator; amplifier means connected to the output of said bridge to amplify said signals; and electronic counter means responsive to said signals.

2. The counter of claim 1 wherein said amplifier means comprises: a radio frequency transformer connected to the output of said bridge; and a broad band amplifier connected to receive the output of said transformer and supply said counter means.

3. The counter of claim 1 wherein said counter means comprises: a trigger circuit connected to receive amplified signals from said amplifier means and produce rectified pulses responsive thereto; and an electronic counter connected to receive and count said pulses.

References Cited by the Examiner

UNITED STATES PATENTS

| | | | |
|---|---|---|---|
| 2,428,290 | 9/1947 | Peck | 340—258 |
| 2,474,156 | 6/1949 | Namenyi-Katz | 235—92 |
| 2,883,108 | 4/1959 | Thornton | 235—92 |
| 2,919,853 | 1/1960 | Wight et al. | 235—92 |
| 3,020,473 | 2/1962 | Cauley | 235—92 |
| 3,083,909 | 4/1963 | Glaser et al. | 235—92 |

MALCOLM A. MORRISON, *Primary Examiner.*